(12) United States Patent
Kelley et al.

(10) Patent No.: US 6,883,717 B1
(45) Date of Patent: Apr. 26, 2005

(54) SECURE CREDIT CARD EMPLOYING PSEUDO-RANDOM BIT SEQUENCES FOR AUTHENTICATION

(75) Inventors: Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/709,112

(22) Filed: Apr. 14, 2004

(51) Int. Cl.[7] .................... G06K 5/00; G06K 19/06
(52) U.S. Cl. ........................ 235/492; 235/380
(58) Field of Search ............................ 235/380, 492

(56) References Cited

U.S. PATENT DOCUMENTS 5,478,994 A * 12/1995 Rahman et al. ............. 235/380
6,641,050 B1   11/2003 Kelley et al.
6,814,283 B1 * 11/2004 Fujimoto .................... 235/382

* cited by examiner

*Primary Examiner*—Daniel Stcyr
*Assistant Examiner*—Daniel A. Hess
(74) *Attorney, Agent, or Firm*—Whitham, Curtis & Christofferson, P.C.; Jay H. Anderson

(57) ABSTRACT

A secure credit card has a pair of linear feedback shift registers (LFSRs) for generating a pair of random numbers. The LFSRs each have a unique initial state and feedback tap configuration. Hence, they each produce a unique sequence of numbers. When a financial transaction occurs, the LFSRs are operated for a random number of clock cycles, to create a pair of matched random numbers. Each card issued has unique LFSR settings, and so will produce characteristic random numbers. At a financial institution, the LFSR settings are known, so the financial institution can determine by calculation if the pair of random numbers is authentic. There are many variations, including a credit card with a secret security code for activation, and 2-way "handshake" communication with the financial institution. Also, one of the LFSRs may be replaced with a binary, or similar counter.

35 Claims, 4 Drawing Sheets

US 6,883,717 B1

SECURE CREDIT CARD EMPLOYING PSEUDO-RANDOM BIT SEQUENCES FOR AUTHENTICATION

BACKGROUND OF INVENTION

The present invention relates generally to credit cards and "smart" cards. More specifically, the present invention relates to a credit card utilizing pseudo-random numbers for authenticating financial transactions and other communications.

Credit cards and debit cards are widely used for financial transactions. Every conventional credit card has a unique, fixed number used for authenticating a transaction. The credit card number is the only information required to access the account and make a purchase. A problem with this system is that it is highly susceptible to fraud. Thieves have developed many methods for obtaining credit card numbers, which allow them access to credit and debit accounts.

U.S. Pat. No. 6,641,050 by the present inventors provides a system for highly secure credit card transactions. The system includes an electronic credit card that generates random numbers. The random numbers are verifiable by the financial institution, are unique for each card, and are unique for each financial transaction. Hence, financial transactions can be authenticated by the financial institution by checking the random numbers. A thief who steals a set of random numbers when a card is used will not be able to use the numbers a second time. This is because a new pair of random numbers is generated for each transaction. If the same random numbers are used for two transactions, then the financial institution is alerted that the card numbers have been stolen.

It would be an advance in the art to provide additional and simplified circuit designs for implementing the secure credit card transaction of the '050 patent. It would also be an advance in the art to provide increased functionality for the secure credit card.

SUMMARY OF INVENTION

The present invention includes a secure credit card having a first counter, a second pseudo-random bit sequence generator, a clock for operating the counter and generator, and a means for operating the clock for an unpredictable number of cycles. The means for operating the clock for an unpredictable number of cycles may include features to allow a human to start and stop the clock.

The first counter can be a binary counter, gray code counter, linear feedback shift register (LFSR) or any other kind of state machine or other system that can count how many clock cycles the clock has run through. The pseudo-random generator is preferably a linear feedback shift register Other pseudo-random generators can also be used.

The LFSRs may have unique initial states and unique feedback tap configurations compared to other cards issued by a financial institution. The LFSRs may be configured to produce sequences of length $2^n-1$ (a maximum length), where n is the number of stages in the shift register.

Preferably, the clock drives both the counter and the generator for the same number of cycles.

The unpredictable duration can be determined by a human action, such as the duration a keypad is pressed, the duration between two keypad entries or the duration between card activation and communication with a card reader.

Preferably, the secure credit card requires a security code for activation. The security code is set at the time the card is issued although it may be changed at a later time.

The card may allow the user to activate the card for a desired number of financial transactions, or activate the card for a desired length of time. The card may also automatically deactivate and power down after a preset duration of inactivity.

In a preferred embodiment, the counter and pseudo-random bit generator are both LFSRs.

Another aspect of the invention includes a method for 2-way "handshaking" between the secure card and a financial institution. In this method, the financial institution requests an LFSR output after a certain specified number of clock cycles. In response to the request, the credit card runs the LFSR for the specified number of clock cycles, and sends the LFSR output to the financial institution. The financial institution then compares the LFSR output with settings (initial state and configuration) known for the LFSR in order to authenticate the credit card. The financial institution may have to look up the credit card in a database (e.g. by card identification number) in order to obtain the LFSR settings.

DETAILED DESCRIPTION

The present invention provides circuits and methods for secure credit cards employing random numbers for authentication. Also, the present invention provides increased functionality for secure credit cards employing random numbers for authentication.

U.S. Pat. No. 6,641,050 by the present inventors provides a system for secure credit card transactions that prevents thieves from accessing a credit card account, even if they steal a credit card or credit card number. In this system, the credit card is a "smart card" with powered electronic circuitry.

Figure 1:
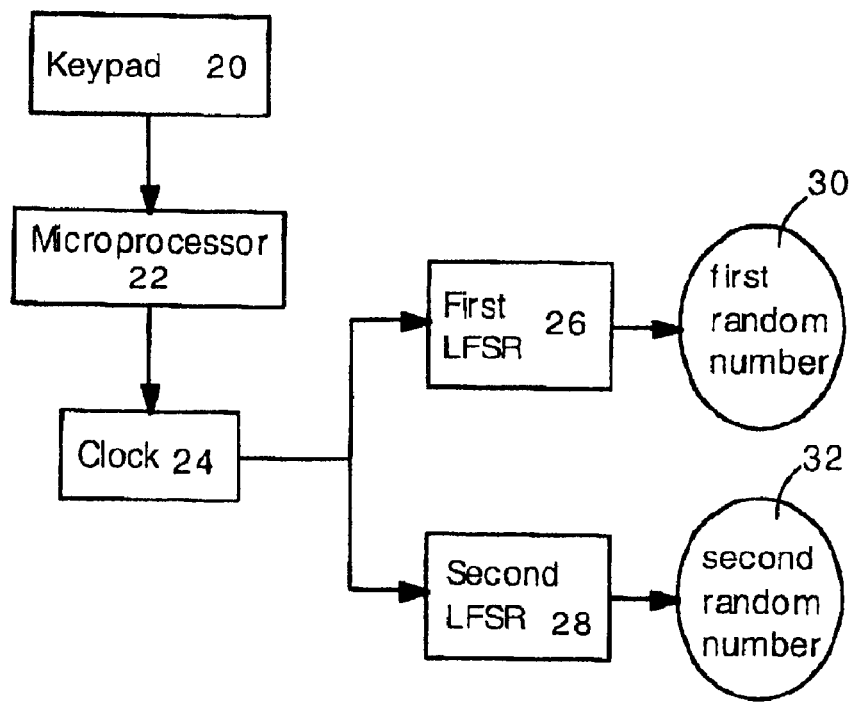
FIG. 1 shows a schematic diagram of a secure credit card according to U.S. Pat. No. 6,641,050.

FIG. 1 shows a schematic diagram electronic circuitry used in a secure credit card according to the '050 patent. Only the components relevant to the present discussion are illustrated; not shown are components such as memory circuits, I/O interface, display and external communication components (e.g. radio frequency antenna, infrared transmitter or magnetic strip).

The secure credit card includes a keypad 20, a microprocessor 22, clock 24, and first and second linear feedback shift registers (LFSRs) 26 28. LFSRs 26 28 are configured to generate first and second random numbers 30 32 when operated for a number of cycles by the clock 24.

The keypad 20 may be a conventional alphanumeric keypad. The keypad allows the credit card user to enter a personal identification number (PIN) or other security code.

Such a PIN or security code may be required to operate the credit card. Preferably, the PIN is personalized and permanently set in the card by electronic fuses (e-fuses).

The microprocessor 22 controls the operation of the clock, and other functions. The microprocessor may authenticate the security code of PIN entered by the user.

The clock 24 is configured to operate under the control of the microprocessor 22. The clock may have a clock speed of, for example, 1–20 Mhz; the speed is not critical. However, the clock speed should be fast enough so that it is very unlikely that the clock will operate for the same number of cycles for two consecutive or nearly consecutive financial transactions. This requirement is more fully explained below.

The LFSRs 26 28 are pseudo-random bit sequence generators, as known in the art. LFSRs are known to generate bit sequences that have random statistics, but are predetermined and predictable, if the initial state and LFSR configuration is known. The first and second LFSRs 26 28 have unique initial states and/or unique initial configurations for each issued card. Hence, each LFSR 26 28 will produce a unique sequence of pseudo-random bits.

The initial state of an LFSR is the starting bit sequence. For example, in an exemplary embodiment, each LFSR includes a 32-bit shift register. The initial state is the state of the 32 bits before the first clock cycle. The LFSR has $2^n-1$ possible initial states (assuming it has a maximum length configuration), where n is the number of bits in the shift register. Preferably, the initial state is permanently set in the card by electronic fuses (e-fuses), as known in the art. Also preferably, the initial state of the LFSRs is unique for each issued card.

Figure 2:
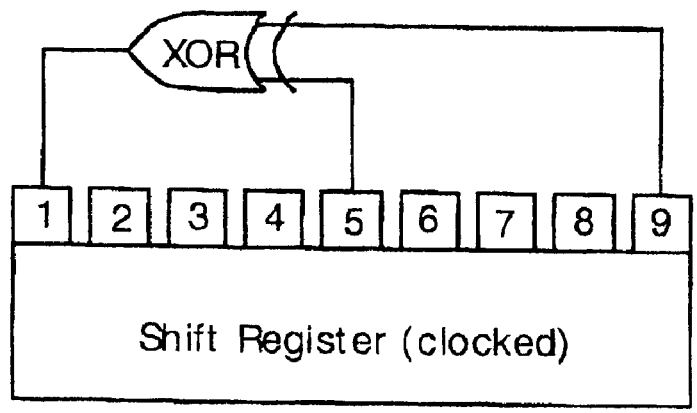
FIG. 2 shows a linear feedback shift register (LFSR) having a 9-bit shift register, two feedback taps (at stages 5 and 9), and an exclusive-OR gate (XOR) providing linear feedback.

The "configuration" of an LFSR refers to the electronic connections between the feedback taps and input of the shift register. FIG. 2 shows a 9-bit linear feedback shift register with an exclusive OR-gate (XOR) providing the linear feedback. Stages 5 and 9 provide the feedback taps, and the output of the XOR gate is fed to the input of the shift register. The LFSR of FIG. 2 provides a maximal length bit sequence (of length $2^n-1$, where n is the bit-length of the shift register), as a result of feedback taps at stages 5 and 9. The LFSR of FIG. 2 will provide a sequence of 511 ($2^9-1$), 9-bit combinations as it is operated.

It is noted that the LFSR used in the credit card can have configurations with 2, 3 or more taps. For LFSRs with 20, 30, 40-bit shift registers, many millions or billions of feedback tap combinations are possible, and many of these feedback tap configurations will provide maximal-length sequences (of length $2^n-1$). Other feedback tap combinations may provide shorter sequences (e.g. of length ½ ($2^n-1$), ⅓ ($2^n-1$), or ¼ ($2^n-1$) etc.), and these shorter sequences can also be used in the invention. Preferably, configurations (i.e. feedback tap connections) for the LFSRs are permanently set in the card by electronic fuses (e-fuses) as known in the art. Also preferably, configurations of the LFSRs provide maximum length sequences and are unique for each issued card.

One feature of the LFSR is that it is cyclic in nature. In other words, it increments through its $2^n-1$ (for a maximal length configuration) states and then repeats the same sequence of states. This allows the LFSR to continue incrementing even if the number of clock cycles is greater than the sequence length of the LFSR. The state of the LFSR will be the remainder of a module division.

Figure 3:
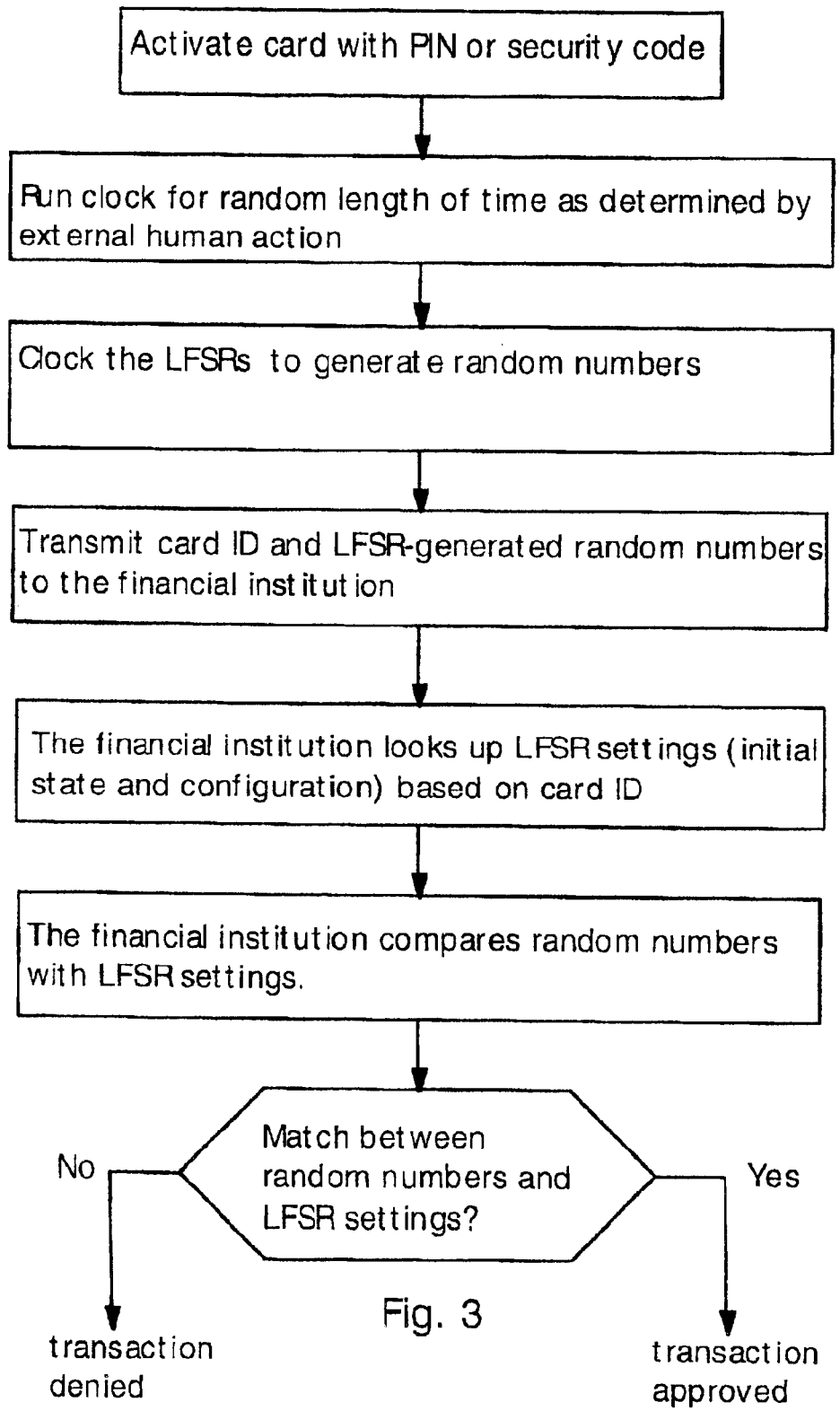
FIG. 3 shows a flow diagram for a preferred method for using the secure credit card system.

FIG. 3 shows a flow chart illustrating a preferred method for operating the present secure credit card.

The first step in operating the present credit card is activation. Activation will typically require the user to enter a PIN or security code using the keypad 20. Once the PIN is authenticated by the microprocessor 22, the card generates the first and second random numbers 30 32.

The random numbers 30 32 are generated by running the clock 24 for an effectively random duration of time. The random duration of time is preferably determined by a random external event. For example, the clock can run for the amount of time it takes the user to enter the PIN. Alternatively, the clock can run for the amount of time between PIN entry and data communication with a card reader in contact with the financial institution. In another embodiment, the card requests (via a display) for the user to hold down a keypad button for a random length of time. In any case, the clock runs at a high speed so that hundreds of thousands or millions of clock cycles occur. When the clock is stopped (e.g. by finalizing the PIN, releasing a keypad button or swiping the card in a magnetic reader), two random numbers will appear at the output of the LFSRs 26 28. The clock should run at speed high enough to render it unlikely that the same pair of random numbers will ever be generated for consecutive uses of the card. Optionally, the clock can run at a speed high enough (and the LFSRs can be large enough) to render it unlikely that the same pair of random numbers will ever be generated over the entire life of the card.

It is very important to note that both LFSRs 26 28 are operated for the same number of clock cycles, or, alternatively, have a fixed relationship or predictable relationship (the relationship varies according to a predictable pattern (e.g., with every transaction the first LFSR is clocked ten more times than the other LFSR)) in the number of clock cycles. In any case, it is essential in the invention that if the number of clock cycles for one LFSR is known, then the number of clock cycles for the other LFSR is also known. For example, the first LFSR 26 can be cycled through ½ or ¼ fewer clock cycles compared to the second LFSR. Also for example, the first LFSR 26 can be cycled through 100 or 1000 fewer clock cycles than the second LFSR. In any case, it is essential that the number of clock cycles experienced by each LFSR has a fixed relationship.

When a financial transaction occurs, a static credit card identification number (i.e. a fixed number akin to conventional credit card numbers), transaction amount and other relevant information is transmitted to the financial institution. Transmission can be provided through an RF connection, infrared link, or magnetic swipe in a card reader, for example. The random numbers 30 32 are also transmitted and allow the financial institution to authenticate the financial transaction.

The random numbers 30 32 provide authentication because the financial institution knows the initial states and configurations of the LFSRs for every card issued. When the financial institution receives the card identification number, the LFSR initial states and configuration are found in a database.

With the LFSR initial states and configurations, the financial institution can rapidly calculate the sequence of random numbers expected for each LFSR 26 28. Since the LFSRs 26 28 are cycled through the same number of clock cycles (or have a fixed, known relationship in the number of clock cycles), the random numbers 30 32 will comprise a matched pair of numbers.

In other words, each LFSR is capable of producing any random number (if maximum-length feedback tap configuration is provided) up to a certain maximum bit-length. But the numbers, though random, are created in matched pairs because the LFSRs are run through the same number of clock cycles. So, by comparing the random number pair 30 32 with number pairs that are calculated at the financial institution from the LFSR initial states and configurations, the financial institution can determine if the numbers were truly generated with the secure credit card. The financial institution will only approve transaction requests accompanied by a matched pair of random numbers.

There will be millions or billions of authentic matched random number pairs for each card. However, it is extremely unlikely that two arbitrarily selected random numbers will comprise a matched pair. Hence, fraudulent transactions cannot be accomplished by merely generating two random numbers.

It is noted that if two consecutive or nearly consecutive transactions use the same matched pair of random numbers, then the financial institution should suspect that the numbers have been stolen. It is very unlikely that the secure credit card will generate the same matched pair in two transactions. If the same matched pair of numbers is received, then the financial institution has several options: permanently deactivate the card, contact the card owner, or request an additional matched pair of numbers.

Any attempt to duplicate the secure credit card or generate fraudulent matched pairs will require a thief to analyze the LFSR initial states and configurations, which are set by microscopic electronic fuses (e-fuses). This is very difficult to reverse engineer.

It is noted that the financial institution must be able to rapidly confirm whether random numbers are matched pairs for a given credit card. A "brute force" method of doing this is as follows:

1) receive two random numbers generated during a financial transaction;
2) pick one random number of the pair,
3) using the initial state and configuration of the LFSR that created the random number, calculate the number of clock cycles that occurred;
4) using the initial state and configuration of the complementary LFSR, and number of clock cycles calculated in step (3), calculate the final state of the complementary LFSR;
5) Compare the final state of the complementary LFSR with the second random number. If there is a match, the random numbers are a genuine matched pair.

This method, though functional and effective for providing the correct answer, is not preferred. It is not preferred because it is slow and it computationally intensive.

A preferred method for authenticating the random number pairs is to use a mathematical algorithm known as the $N^{th}$-State Algorithm. The $N^{th}$-state algorithm can be used to rapidly calculate the state of an LFSR run through any number of clock cycles.

The initial LFSR states are not necessarily different for each issued credit card. All credit cards may have LFSRs with the same initial states. In this case, the LFSRs on each card must have unique configurations (e.g. feedback taps).

The configurations of the LFSRs are not necessarily different for each issued credit card. All issued credit cards may have LFSRs with the same configuration. In this case the LFSRs on each card must have unique initial states.

It is important to note that the present system will not provide security if all the issued cards have the same initial LFSR states and the same LFSR configurations. In this case, all issued cards will employ the same matched pairs, and hence a matched pair generated by one card can be used with any other card. This situation is obviously not secure.

It is noted that any pseudo-random sequence generator can be used in place of the LFSRs. For example, non-linear feedback shift registers can be used in place of the LFSRs. However, LFSRs are preferred for their simplicity, reliability and small number of logic components.

It is noted that one of the LFSRs can be replaced with a non-random counter. The non-random counter can be any kind of counter that indicates the number of clock cycles. State machines, gray-code counters, binary counters or other kinds of counters are suitable. If a conventional binary counter, gray code counter, or other kind of non-random counter is used, it is preferable for the initial states of the non-random counter to be unique for every issued card. The initial state can be set by e-fuses.

Figure 4:
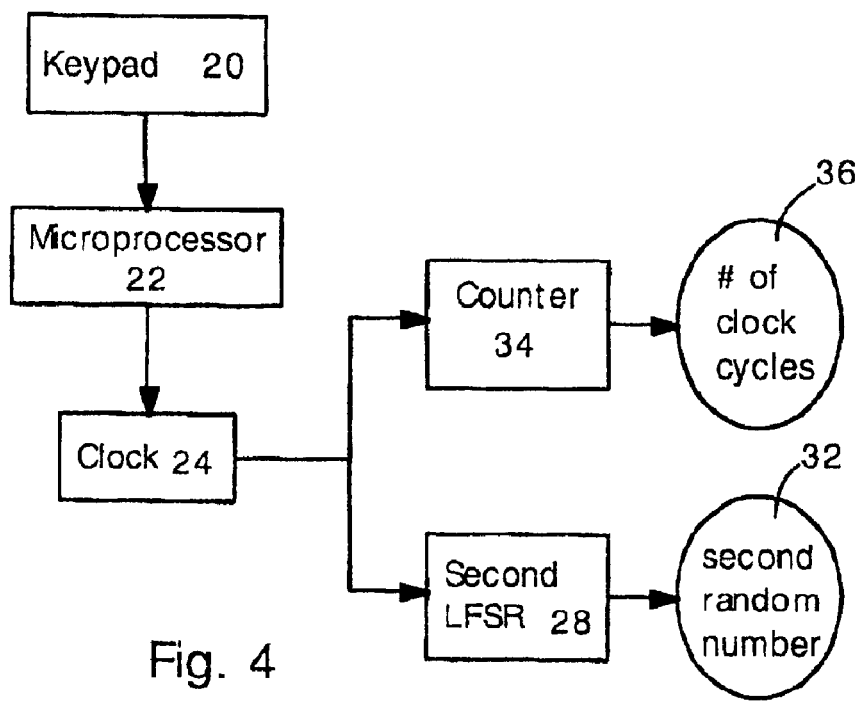
FIG. 4 shows a schematic diagram of a secure credit card having only one LFSR.

FIG. 4 shows an alternative embodiment of the secure credit card according to the present invention. In this embodiment, the first LFSR 26 is replaced with clock-cycle counter 34. The counter 34 counts the number of clock cycles, and outputs the number of clock cycles as a binary number 36. In operation, the secure credit card of FIG. 4 operates very much like the card of FIG. 1. The clock 24 is operated for a random number of cycles. Then, the number of clock cycles, expressed as number 36 is transmitted to the financial institution along with the second random number 32. The number of clock cycles indicates to the financial institution what the second random number 32 must be. The financial institution compares the second random number 32 created by the second LFSR 28 with a number calculated from the LFSR initial state and configuration, and the number of clock cycles. Authentication is confirmed if the second random number 32 matches the initial state and configuration of the second LFSR 28.

It is noted that any counter or state machine (pseudo-random or cyclical) can be substituted for the counter 34. The counter can count in conventional binary, gray code or any other pattern. Whatever type of counter is used, the output of the counter must indicate to the financial institution the number of clock cycles that occurred.

Figure 5:
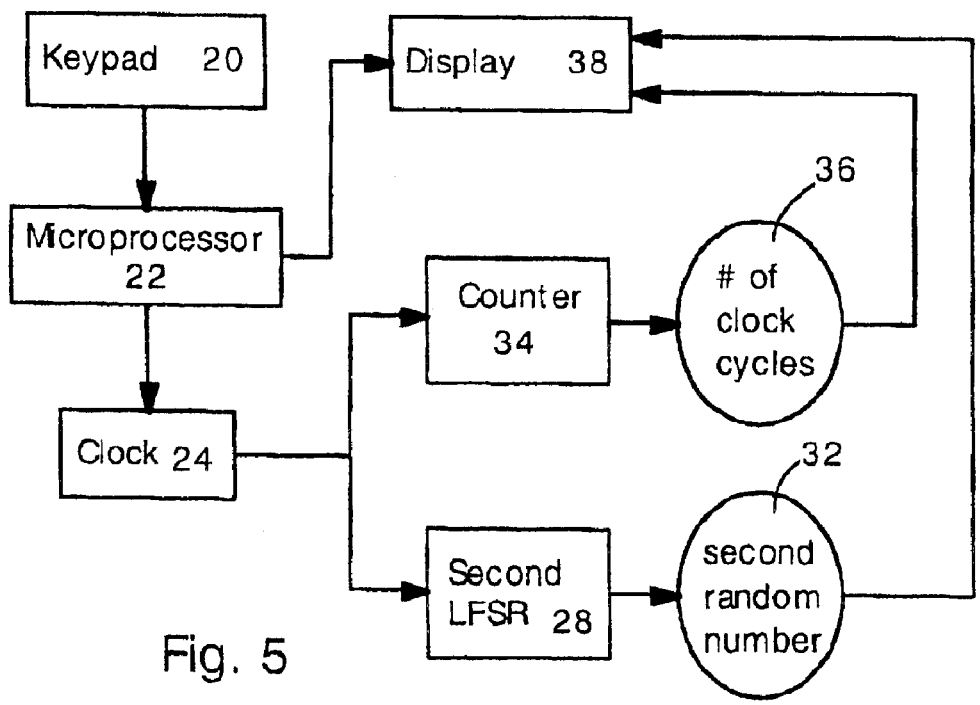
FIG. 5 shows a schematic diagram of an embodiment having a display for displaying a matched pair of numbers.

FIG. 5 shows a preferred embodiment of the invention where the card has a display 38 controlled by the microprocessor 22. The display may be an LCD display, organic LED display or any other kind of electronic display. In this embodiment, the display will show the output of the first counter 34 (or first LFSR 26) and the output of the second LFSR 28. With these numbers displayed, the user can manually enter them into a credit card reader, computer terminal or any other device that does not have a credit card reader. In this way, the secure credit card can be used to make transactions over the internet using a computer that does not have a credit card reader. Preferably, the users PIN or security code must be activated before the card will generate and display the numbers required to make a transaction.

In another embodiment of the invention, the microprocessor 22 allows the user to activate the card for a specified number of transactions. In this case, the card should include memory circuitry to allow the transaction data to be stored.

Alternatively, the card may allow the user to activate the card for a certain period of time, for example 5 minutes or 1 day. This can be accomplished using the microprocessor 22.

Also preferably, the card includes memory for storing a record of the types and amounts of financial transactions. This can also be accomplished using the microprocessor 22.

When desired, a listing of these transactions may be displayed on the display after entering the security code.

Also, the present invention includes an embodiment where the security code or users PIN can be reprogrammed. This can be accomplished by burning new efuse settings in the card. If e-fuses are used, then the security code can only be changed a finite number of times over the lifetime of each card.

It is also noted that individual credit cards can have LFSRs with unique bit lengths. For example, different credit cards can have LFSRs with 20, 30, 40 50 or other numbers of bits. Varying the bit length of the shift register can increase the security and make it even more difficult for a thief to generate a matched pair of numbers.

Also, it is noted that the present secure credit card may have 3 or more LFSRs or other counters. In this case, a trio of matched numbers must be sent to the financial institution in order to authenticate a transaction. A secure credit card with 3 or more LFSRs will provide an even higher degree of security.

Figure 6:
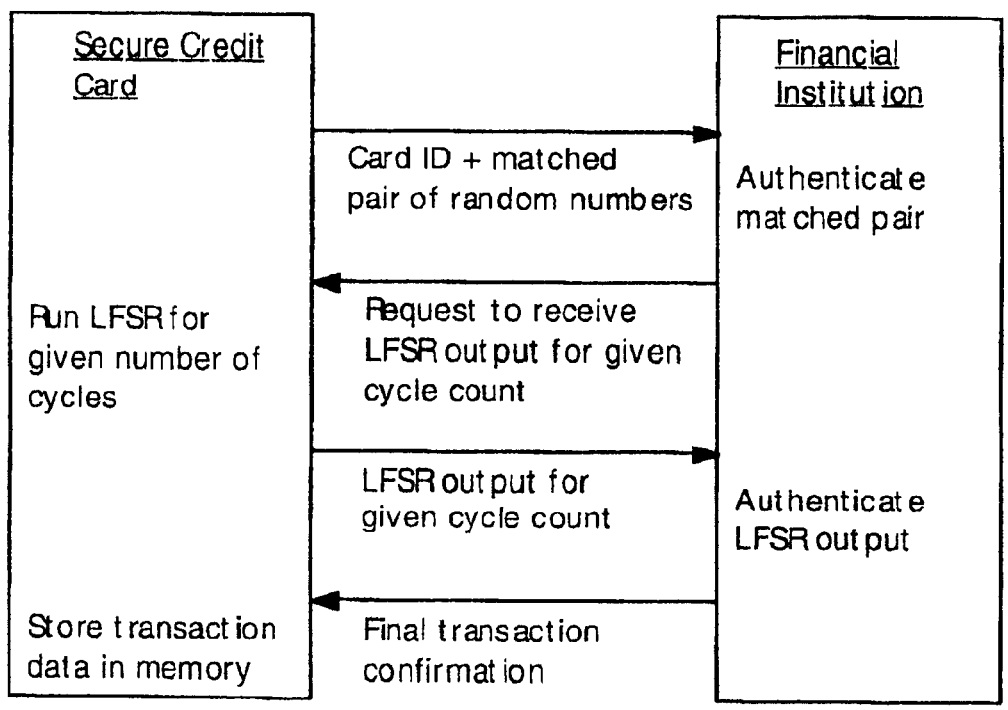
FIG. 6 illustrates a method for 2-way communication providing card authentication.

The present invention also includes an embodiment involving 2-way "handshake" communication between the credit card and the financial institution. In this embodiment, the financial institution queries the credit card for a LFSR output based on a specified clock count. This feature will prevent a thief such as a waiter from borrowing the card, and stealing a matched pair of random numbers. This embodiment is graphically illustrated in FIG. 6. Firstly, the secure credit card transmits the card ID number and matched pair of random numbers 30 32 as described above. The financial institution confirms the random numbers as described above, preferably using the $N^{th}$-state algorithm.

Then, in the 2-way communication embodiment, the financial institution sends a query to the secure credit card. Specifically, the financial institution requests the credit card to cycle one of the LFSRs by a specific number of cycles, and then send the LFSR output to the financial institution. In this way, the financial institution can be certain that the card is physically present at a card reader device. This method prevents a thief from stealing a valid matched number pair, and using the matched number pair without the physical credit card. This method will be effective in preventing waiters from borrowing the credit card and secretly obtaining one or more valid matched number pairs.

After a transaction is complete, the secure credit card may receive confirmation from the financial institution. Confirmation of the transaction may be stored in electronic memory located in the secure credit card.

In a preferred embodiment, the 2-way handshake method is used when desired by the card owner. For example, the card owner may desire to the more secure 2-way handshake technique when a third party such as a bartender or waiter will be in physical possession of the credit card.

It is also noted that communications between the secure credit card and financial institution can be encrypted to provide an additional layer of security. Conventional, well-known encryption techniques can be used. Also, the LFSR hardware on the secure credit card can be used for encrypting transmitted information (e.g. by feeding transmitted data into the LFSR input).

It is also noted that the present invention includes the option of emulating the counters and LFSRs by software. It is well known that the behavior of digital circuits such as LFSR and counters can be programmed into a microprocessor or other programmable circuitry.

It will be clear to one skilled in the art that the above embodiment may be altered in many ways without departing from the scope of the invention. Accordingly, the scope of the invention should be determined by the following claims and their legal equivalents.

What is claimed is:

1. A secure credit card, comprising:
   a) a counter;
   b) a pseudo-random bit sequence generator;
   c) a clock for driving the counter and for driving the pseudo-random bit sequence generator, wherein the clock is operable for an unpredictable number of cycles, wherein the unpredictable number of cycles is determined by a human action of unpredictable duration.

2. The secure credit card of claim 1 wherein the counter is a first linear feedback shift register (LFSR).

3. The secure credit card of claim 2 wherein the first LFSR has a different initial state compared to other issued credit cards.

4. The secure credit card of claim 2 wherein the first LFSR has a different configuration compared to other issued credit cards.

5. The secure credit card of claim 2 wherein the first LFSR is configured to have a sequence length of $2^n-1$, where n is a number of stages in the shift register.

6. The secure credit card of claim 2 wherein the first LFSR has an initial state and configuration set by electronic fuses.

7. The secure credit card of claim 1 wherein the pseudo-random bit sequence generator is a second linear feedback shift register (LFSR).

8. The secure credit card of claim 7 wherein the second LFSR has a different initial state compared to other issued credit cards.

9. The secure credit card of claim 7 wherein the second LFSR has a different configuration compared to other issued credit cards.

10. The secure credit card of claim 7 wherein the second LFSR is configured to have a sequence length of $2^n-1$, where n is a number of stages in the shift register.

11. The secure credit card of claim 7 wherein the second LFSR has an initial state and configuration set by electronic fuses.

12. The secure credit card of claim 1 wherein the clock drives the first counter and the second pseudo random bit generator for the same number of cycles.

13. The secure credit card of claim 1 wherein the clock drives the first counter and the second pseudo random bit generator for numbers of cycles having a fixed mathematical relationship.

14. The secure credit card of claim 1 wherein the clock has a clock speed in the range of about 0.1–100 megahertz.

15. The secure credit card of claim 1 wherein the first counter and second pseudo-random bit sequence generators are virtual entities emulated in an electronic processor.

16. The secure credit card of claim 1 further comprising a display for displaying numbers produced by the first counter and the second pseudo random bit generator.

17. The secure credit card of claim 1, further comprising a means for activating the card for a desired time duration.

18. The secure credit card of claim 1, further comprising a means for activating the card for a desired number of transactions.

19. The secure credit card of claim 1, further comprising a means for resetting a secure access code or PIN.

20. The secure credit card of claim 1 wherein said unpredictable number of cycles is determined by a human action of unpredictable duration is determined by one of a duration a keypad is pressed, a duration between two keypad entries, or a duration between card activation and communication with a card reader.

21. A secure credit card, comprising:
   a) a virtually emulated first linear-feedback shift register (LFSR);
   b) a second linear-feedback shift register (LFSR) or a second virtually emulated LFSR; and
   c) a clock for driving the first and second linear-feedback shift registers, wherein the clock is operable for an unpredictable number of cycles, wherein the unpredictable number of cycles is determined by a human action of unpredictable duration.

22. The secure credit card of claim 21 wherein the first LFSR and second LFSR have different initial states compared to other issued credit cards.

23. The secure credit card of claim 21 wherein the first LFSR and second LFSR have different configurations compared to other issued credit cards.

24. The secure credit card of claim 21 wherein the first LFSR and second LFSR are configured to have a sequence length of 2 where n is a number of shift register stages.

25. The secure credit card of claim 21 wherein the first LFSR and second LFSR each have an initial state and configuration set by electronic fuses.

26. The secure credit card of claim 21 wherein the clock drives the first LFSR and the second LFSR for the same number of cycles.

27. The secure credit card of claim 21 wherein the clock drives the first LFSR and the second LFSR for numbers of cycles having a fixed mathematical relationship.

28. A method for authenticating a secure credit card having a linear feedback shift register (LFSR), comprising the steps of:
   a) sending from the credit card to a financial institution a card identification number uniquely associated with LFSR settings;
   c) sending from the financial institution to the credit card a request for an output of the LFSR after m clock cycles;
   d) operating the LFSR for m clock cycles to produce an LFSR output;
   e) sending the LFSR output from the card to the financial institution;
   f) comparing the LFSR output with LFSR settings for the credit card to authenticate the credit card.

29. The method of claim 28 further comprising the step of looking up in a database at the financial institution the settings information associated with the card identification number.

30. A method for authenticating a secure credit card having a counter and a pseudo-random bit sequence generator (GEN), comprising the steps of:
   a) driving the counter and the GEN for numbers of cycles having a fixed or predictable mathematical relationship;
   b) transmitting to a financial institution outputs of the counter and GEN after step (a);
   c) authenticating the credit card by comparing the outputs produced in step (b) with settings of the counter and GEN known to the financial institution.

31. The method of claim 30 wherein the counter and GEN are driven for the same number of cycles.

32. The method of claim 30 wherein the unpredictable number of cycles is determined by a clock operated for an unpredictable duration.

33. The method of claim 32 wherein the unpredictable duration is determined by a human action.

34. The method of claim 33 wherein said human action is determined by one of a duration a keypad is pressed, a duration between two keypad entries, or a duration between card activation and communication with a card reader.

35. The method of claim 30 wherein in said driving step, said counter and GEN are each driven for a plurality of cycles.

* * * * *